United States Patent
Harrod et al.

(10) Patent No.: US 12,255,794 B2
(45) Date of Patent: Mar. 18, 2025

(54) METHODS, SYSTEMS, AND COMPUTER READABLE MEDIA FOR SELECTIVELY PROCESSING A PACKET FLOW USING A FLOW INSPECTION ENGINE

(71) Applicant: Keysight Technologies, Inc., Santa Rosa, CA (US)

(72) Inventors: Jonathan Lee Harrod, Austin, TX (US); Shardendu Pandey, Cedar Park, TX (US); Jonathan Glenn Stroud, Austin, TX (US); Stefan Jan Johansson, Round Rock, TX (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/695,759

(22) Filed: Mar. 15, 2022

(65) Prior Publication Data
US 2023/0300045 A1 Sep. 21, 2023

(51) Int. Cl.
*H04L 43/062* (2022.01)
*H04L 43/00* (2022.01)
*H04L 43/028* (2022.01)

(52) U.S. Cl.
CPC .......... *H04L 43/062* (2013.01); *H04L 43/028* (2013.01); *H04L 43/14* (2013.01)

(58) Field of Classification Search
CPC ..... H04L 43/062; H04L 43/028; H04L 43/14; H04L 43/026; H04L 47/2483; H04L 47/2441; H04L 45/38
See application file for complete search history.

(56) References Cited

U.S. PATENT DOCUMENTS 7,385,924 B1 * 6/2008 Riddle ............... H04L 41/5022
370/252
7,644,150 B1 1/2010 Nucci et al.
(Continued)

OTHER PUBLICATIONS

Lanner, "Why P4 Programmable Switch Is Relevant for Software Defined Infrastructure?", Lanner Electronics, Lanner, Feb. 9, 2022, lannerinc.com/news-and-events/eagle-lanner-tech-blog/why-p4-programmable-switch-is-relevant-for-software-defined-infrastructure (Year: 2022).*

(Continued)

*Primary Examiner* — Alex H. Tran

(57) ABSTRACT

A method for selectively processing a packet flow using a flow inspection engine is disclosed. The method includes receiving, by at least one hardware data plane processor component in a network packet broker, a plurality of packets associated with a packet flow, and forwarding, by the at least one hardware data plane processor component to at least one flow inspection engine, a copy of at least a portion of one or more of the initial packets of the packet flow. The method further includes providing, by the at least one hardware data plane processor component to the at least one flow inspection engine, packet flow statistical data resulting from a high throughput processing of the plurality of packets by the at least one hardware data plane processor component and generating, by the at least one flow inspection engine, metadata records using the copy at least a portion of the of the one or more of the initial packets and the packet flow statistical data, wherein the at least one hardware data plane processor component generates the statistical data from the plurality of packets independent of any instruction from the at least one flow inspection engine.

8 Claims, 6 Drawing Sheets

(56) References Cited

U.S. PATENT DOCUMENTS

| | | | |
|---|---|---|---|
| 7,664,048 B1* | 2/2010 | Yung | H04L 41/28 709/224 |
| 8,503,307 B2* | 8/2013 | Tourrilhes | H04L 41/40 709/224 |
| 8,943,587 B2* | 1/2015 | Cooley | H04L 63/0245 726/22 |
| 9,094,444 B2 | 7/2015 | Baltatu et al. | |
| 9,230,213 B2 | 1/2016 | Rash et al. | |
| 9,258,225 B2* | 2/2016 | Hill | H04L 63/0245 |
| 9,386,103 B2 | 7/2016 | Clifton et al. | |
| 10,009,364 B2 | 6/2018 | Dasgupta et al. | |
| 10,205,641 B2* | 2/2019 | McGrew | H04L 43/026 |
| 10,404,732 B2 | 9/2019 | Munro et al. | |
| 10,432,528 B2* | 10/2019 | Cortes Gomez | H04L 47/11 |
| 10,459,827 B1 | 10/2019 | Aghdaie et al. | |
| 10,574,512 B1 | 2/2020 | Mermoud et al. | |
| 10,716,017 B2 | 7/2020 | Lyon et al. | |
| 10,778,508 B2 | 9/2020 | Artzi et al. | |
| 10,887,786 B2 | 1/2021 | Vedam et al. | |
| 10,999,188 B1 | 5/2021 | Cafarelli et al. | |
| 11,095,535 B2 | 8/2021 | Mirzazad Barijough et al. | |
| 11,190,417 B2 | 11/2021 | Raney et al. | |
| 11,394,640 B2* | 7/2022 | Ramaswamy | H04L 45/20 |
| 11,418,420 B2* | 8/2022 | Sivaraman | H04L 43/045 |
| 11,431,829 B2* | 8/2022 | Vann | H04L 45/7453 |
| 11,575,560 B2* | 2/2023 | Ramachandran | H04L 41/0668 |
| 11,863,467 B2* | 1/2024 | Galles | H04L 41/5019 |
| 11,949,570 B2 | 4/2024 | Pandey et al. | |
| 2010/0153316 A1 | 6/2010 | Duffield et al. | |
| 2015/0113133 A1 | 4/2015 | Srinivas et al. | |
| 2015/0256431 A1* | 9/2015 | Buchanan | H04L 63/1408 709/224 |
| 2016/0191568 A1 | 6/2016 | Nispel et al. | |
| 2017/0339022 A1 | 11/2017 | Hegde et al. | |
| 2019/0222591 A1 | 7/2019 | Kislitsin et al. | |
| 2020/0106795 A1 | 4/2020 | Servajean et al. | |
| 2020/0314128 A1 | 10/2020 | Hild | |
| 2020/0358674 A1 | 11/2020 | Harikrishnan et al. | |
| 2020/0364561 A1 | 11/2020 | Ananthanarayanan et al. | |
| 2021/0328929 A1* | 10/2021 | Kleiman | H04L 47/21 |
| 2022/0060518 A1 | 2/2022 | Higgins et al. | |
| 2023/0026463 A1* | 1/2023 | Saha | H04L 41/145 |
| 2023/0031654 A1 | 2/2023 | Pandey et al. | |

OTHER PUBLICATIONS

Kekely et al. "Software Defined Monitoring of Application Protocols," IEEE Transactions on Computers, vol. 65, No. 2, pp. 615-626 (Feb. 2016).

Commonly-Assigned, co-pending U.S. Appl. No. 17/390,860 for "Methods, Systems, and Computer Readable Media for Utilizing Machine Learning to Automatically Configure Filters at a Net" (Unpublished, filed Jul. 30, 2021).

Nguyen et al., "GEE: A Gradient-based Explainable Variational Autoencoder for Network Anomaly Detection," arXiv:1903.06661v1, pp. 1-10 (Mar. 15, 2019).

Sanjuas, "Application of Machine Learning to Flow-based Network Monitoring," Polygraph.io, pp. 1-13 (2016).

Saboori et al., "Automatic firewall rules generator for anomaly detection systems with Apriori algorithm," 2010 3rd International Conference on Advanced Computer Theory and Engineering (ICACTE), pp. 1-4 (2010).

Pranschke et al., "Automated Firewall Rule Set Generation Through Passive Traffic Inspection," Conference: Information Security South Africa Conference, pp. 1-10 (Jan. 2009).

Mahoney et al., "PHAD: Packet Header Anomaly Detection for Identifying Hostile Network Traffic," Florida Institute of Technology Technical Report CS-2001-04, pp. 1-17 (2001).

Shabtai, et al., "F-Sign: Automatic, Function-Based Signature Generation for Malware" in IEEE Transactions on Systems, Man, and Cybernetics, Part C (Applications and Reviews), vol. 41, No. 4, pp. 494-508, Jul. 2011, doi: 10.1109/TSMCC.2010.2068544.

Balakrishnan, et al., "A Study of the Classification Capabilities of Neural Networks Using Unsupervised Learning: A Comparison with K-Means Clustering", the Psychometric Society, 17 pages (1994).

Non-Final Office Action for U.S. Appl. No. 17/390,860 (Jun. 29, 2023).

Notice of Allowance for U.S. Appl. No. 17/390,860 (Dec. 5, 2023).

* cited by examiner

METHODS, SYSTEMS, AND COMPUTER READABLE MEDIA FOR SELECTIVELY PROCESSING A PACKET FLOW USING A FLOW INSPECTION ENGINE

TECHNICAL FIELD

The subject matter described herein relates to analyzing packets in a packet flow. More particularly, the subject matter described herein relates to methods, systems, and computer readable media for selectively processing a packet flow using a flow inspection engine.

BACKGROUND

As network traffic rates increase and the number and different types of tools required to analyze that network traffic continue to grow, the generation and use of flow-based metadata (such as NetFlow) has become increasingly important. At present, network operators utilize various hardware based or software based metadata record generation solutions, each of which has its advantages and disadvantages. For example, metadata generation tools implemented solely as software embodiments have significant limitations on the amount of packets that can be processed in an efficient manner. Likewise, hardware-based metadata generation solutions typically cannot keep pace with the continuously evolving needs of traffic analysis processing that must be applied to the different types of generated metadata (e.g., application-specific data, geographic data, handset data, etc.).

In light of these and other difficulties, there exists a need for methods, systems, and computer readable media for selectively processing a packet flow using a flow inspection engine.

SUMMARY

A method for selectively processing a packet flow using a flow inspection engine is described herein. The method includes receiving, by at least one hardware data plane processor component in a network packet broker, a plurality of packets associated with a packet flow and forwarding, by the at least one hardware data plane processor component to at least one flow inspection engine, a copy of at least a portion of one or more of the initial packets of the packet flow. The method further includes providing, by the at least one hardware data plane processor component to the at least one flow inspection engine, packet flow statistical data resulting from a high throughput processing of the plurality of packets by the at least one hardware data plane processor component and generating, by the at least one flow inspection engine, metadata records using the copy of at least a portion of the one or more of the initial packets and the packet flow statistical data, and wherein the at least one hardware data plane processor component generates the statistical data from the plurality of packets independent of any instruction from the at least one flow inspection engine.

According to another aspect of the method described herein, the at least one hardware data plane processor component is configured to cease forwarding the copy of at least a portion of the one or more of the initial packets of the packet flow in response to receiving a stop command message from the at least one flow inspection engine.

According to another aspect of the method described herein, the at least one hardware data plane processor component is configured to automatically cease sending the copy of at least a portion of the one or more of the initial packets after a predefined number of initial packets is forwarded to the at least one flow inspection engine.

According to another aspect of the method described herein, the flow inspection engine is located in the network packet broker.

According to another aspect of the method described herein, the flow inspection engine is located in a computing device that is separate and external from the network packet broker.

According to another aspect of the method described herein, the at least one flow inspection engine is a software based construct.

According to another aspect of the method described herein, the packet flow statistical data and the copy of at least a portion of the one or more of the initial packets are both identified by a common flow identifier.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
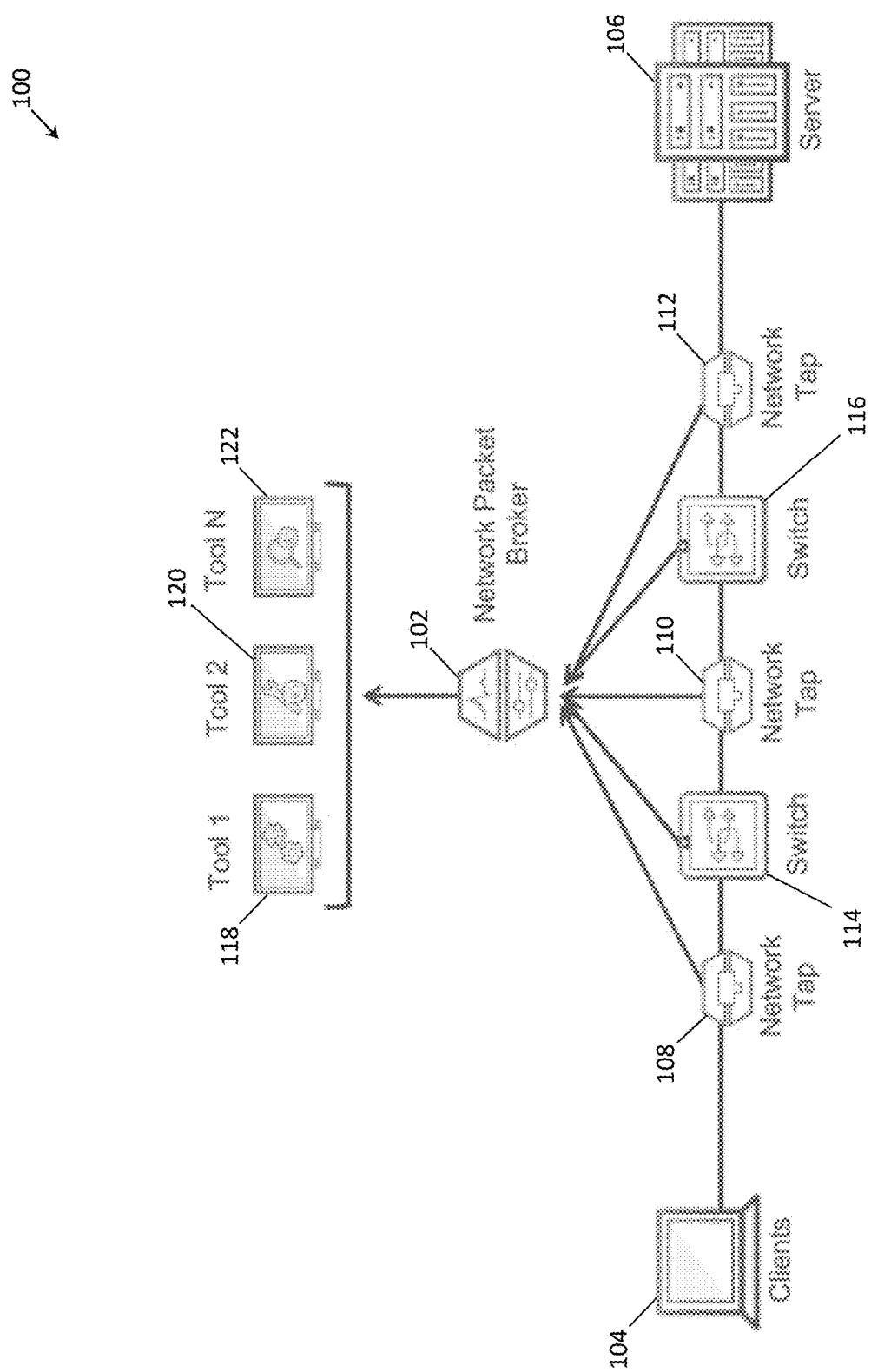
FIG. 1 is a block diagram illustrating an exemplary system supported by a network packet broker.

The subject matter described herein includes methods, systems, and computer readable media for selectively processing a packet flow using a flow inspection engine. As used herein, the term "flow" or "packet flow" is understood to include a sequence of packets sent from a particular source (e.g., source computer) to a particular unicast, anycast, or multicast destination (e.g., destination computer) that the source desires to label as a flow. A flow may also include all packets in a specific transport connection or a media stream. In packet switching networks, a flow may also refer to a packet flow, a traffic flow, a network flow, or the like.

In some embodiments, the disclosed subject matter includes a hybrid packet analysis solution that utilizes a hardware-based implementation to detect and forward the first 'N' packets of a packet flow to one or more software applications for in-depth packet analysis, where N represents a predefined number of initial packets of a newly identified packet flow that should be shunted to a software based flow inspection engine by a hardware based data plane processing pipeline (e.g., after identifying a new packet flow). Notably, the first N packets forwarded to the flow inspection engine may be designated with a flow tag (i.e., a flow identifier) that links or correlates the packet(s) processed by the software based flow inspection engine and the packet data stream processed by the data plane processing pipeline. After the data plane processing pipeline forwards the designated N packet copies to the flow inspection engine, the data plane processing pipeline is configured to immediately stop sending packet copies to the flow inspection engine. Further, the data plane processing pipeline is configured to, for the life of the packet flow, continue maintaining statistics of the packet flow traffic traversing the pipeline and/or its host computing device (e.g., a network packet broker (NPB)). In some alternate embodiments, packet copies may be sent to a default flow inspection engine until the flow inspection engine is triggered to send a 'stop command message' that indicates that the flow inspection engine has seen a sufficient amount of copied packets to analyze the packet flow and other statistical data.

While the following description describes the flow inspection engine and the data plane processing pipeline both residing in a common network packet broker (i.e., the same network packet broker), it is understood that the flow inspection engine and data plane processing pipeline can be hosted by separate and/or different computing devices without departing from the scope of the disclosed subject matter.

In some embodiments, the flow inspection engine can be configured to continue to receive statistics for a particular packet flow from the data plane processing pipeline based on the flow identifier/tag. The flow inspection engine may be configured to utilize the additional insight gained from analyzing the first N packets to generate different types of metadata records for the flow. For example, additional insight utilized by the flow inspection engine can include different types of metadata based on the packet protocol type. For example, GTP encapsulated packet flows can include tunnel endpoint identifiers (TEIDs) and generic routing encapsulating (GRE) tunnels may include GRE keys. As such, multiple flow inspection engines can generate their own metadata records based on flow aspects that are of respective particular interest while the actual packet flow accounting is performed by the data plane processing pipeline. Notably, the disclosed subject matter is particularly effective for processing large traffic flows, such as flows originating from streaming services, since all but the initial N packets are shunted away from the software based flow inspection engine(s).

FIG. 1 is a block diagram illustrating an exemplary system 100 comprising various network elements supported by and communicating with a network packet broker 102. While the components of disclosed flow match engine may reside on network packet broker 102, it is appreciated that other network elements (e.g., network testing platform or some other network visibility platform) that are configured to monitor and analyze packet traffic can be utilized without departing from the scope of the disclosed subject matter. The term "network packet broker" as used herein may refer to a network device that forwards copies of packets communicated over a monitored network (e.g., packets communicated between one or more clients 104 and server 106) to one or more network tools 118-122 while operating in an out-of-band mode of operation. Likewise, network packet broker 102 can be used to forward live network traffic to the one or more network tools 118-122 while operating in an in-line mode. In the out-of-band mode of operation, network packet broker 102 receives copies of packets from network taps 108-112 and subsequently forwards the packet copies to network tools 118-122, while the original live packets proceed to their destinations (e.g., server 106) without passing through or being filtered by the network packet broker 102. In the in-line mode of operation, the network packet broker 102 receives live traffic from one or more bypass switches 114-116, forwards the packets to network tools 118-122, receives packets that pass the analysis from the network tools 118-122, and forwards the packets back to the bypass switch, which forwards the packets to the network (e.g., destination server 106).

Although not shown in FIG. 1, network packet broker can be a computing device that includes at least one processor and memory. Processor(s) may include any processing device, such as a central processing unit (CPU), microcontroller, microprocessor, embedded processor, or the like. Likewise, local memory may include disk memory devices, chip memory devices, programmable logic devices (e.g., included in FPGAs), and application specific integrated circuits.

Figure 2:
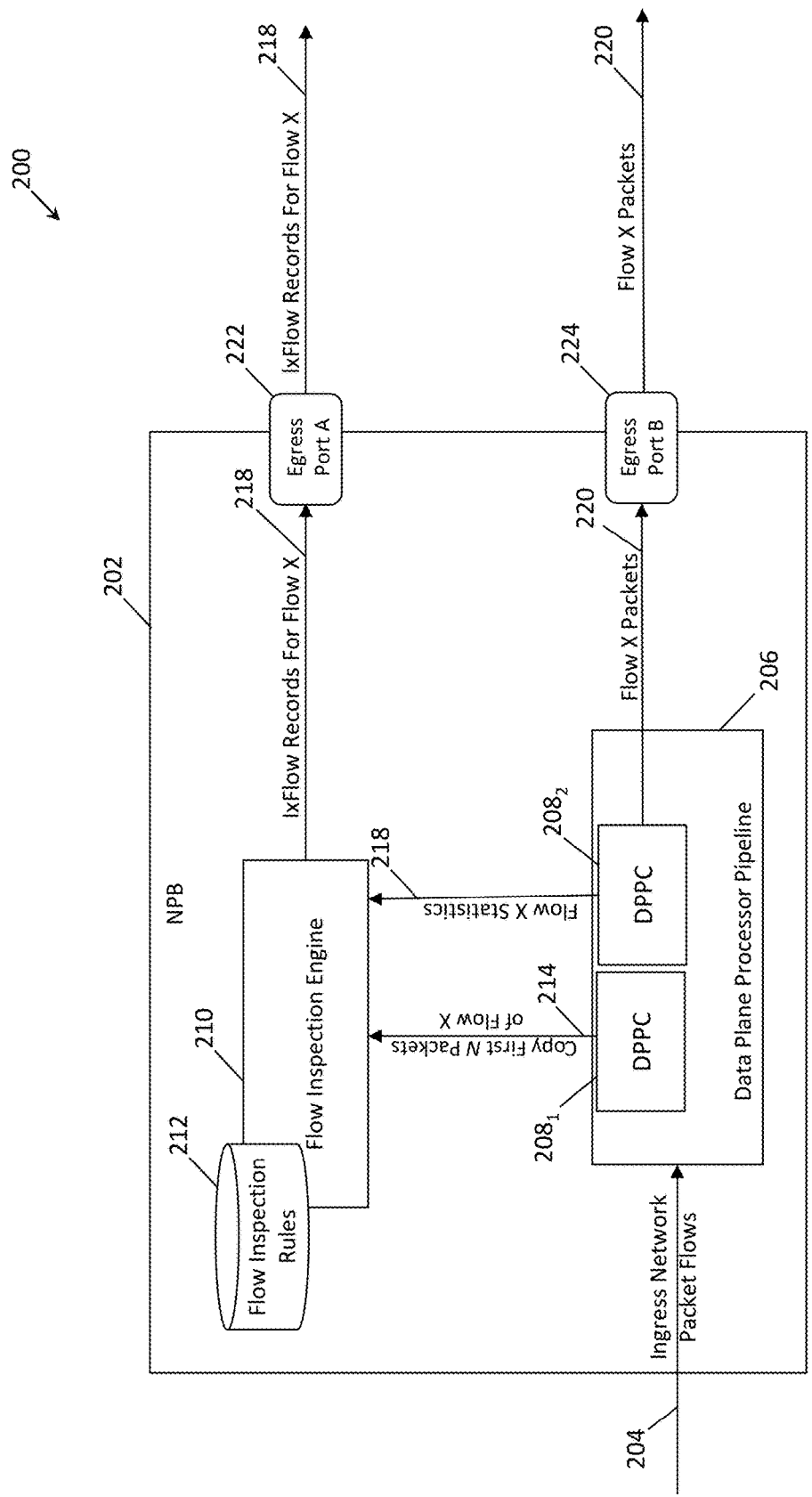
FIG. 2 is a block diagram illustrating an exemplary network packet broker that includes a flow inspection engine.

FIG. 2 is a block diagram illustrating an exemplary network packet broker 202 that includes a flow inspection engine. In some embodiments, network packet broker 202 can be configured to directly receive i) network packet traffic while operating in an in-line operation mode or ii) packet copies from network taps while operating in an out-of-band operation mode. As shown in FIG. 2, network packet broker 202 includes a flow inspection engine 210 (e.g., a flow inspection engine element) and one or more hardware-based data plane processor components 208. Each of data plane processor components 208 may include, but not limited to, an application specific integrated circuit (ASIC) processor, a P4-based programmable processor, a field programmable gate array (FPGA) processor, or the like. As indicated above, data plane processor components 208 may be difficult to update and/or be configured to conduct network traffic analysis considering the different types of metadata processing being requested (e.g., application specific data, geographic data, handset data, and the like). It is also understood that while FIG. 2 illustrates flow inspection engines 210 and data plane processor components 208 located in a single network packet broker, the flow inspection engine does not necessarily need to reside in the same network element as the data plane processor components.

In some embodiments, data plane processor components 208 collectively form a data plane processing pipeline 206, which can be configured to receive and process a packet flow communicated from a source in a monitored network. In some embodiments, at least one of the data plane processor components 208 is configured to monitor the incoming ingress packets in an attempt to detect a new and/or previously undetected packet flow. Notably, one or more of the data plane processor components 208 is configured to parse an incoming packet and identify the source address and destination address information (e.g., Internet protocol addresses). This information can be used by one or more of the data plane processor components 208 (e.g., compare to recently processed packet flow addresses) to determine if the presently received packet flow is new and/or previously undetected. In some embodiments, the plane processor components can identify a flow via a key, which is constructed from a number included in the fields of a packet's header (e.g., a source or destination IP address and/or source or destination port number). The data plane processor may also maintain a comparison table containing keys for all active flows. When a packet is received, the key is looked up in the comparison table. If a value/entry matching the key is identified, the data plane process designates the packet as belonging to an existing flow. If no matching entry is found, the data plane process designates the packet as belonging to a new flow.

In one embodiment, the packet flow processing performed by network packet broker 202 is conducted as follows:

In step 1, packets associated with one or more packet flows are received from a source entity located in a network that is being monitored by network packet broker 202. In some embodiments, an ingress network packet flow 204 received at the ingress network port of the network packet broker includes copies of live packet flows that have been obtained via one or more network taps (e.g., network packet broker 202 operating in out-of-band mode). In other embodiments, the packets of ingress network packet flow 204 may be live packets being communicated via the network (e.g., network packet broker 202 operating in an in-line mode).

In step 2, the received packets are processed in data plane processing pipeline 206 by one or more data plane processor components 208. Notably, a data plane processor component $208_1$ may be configured to identify a new and/or previously undetected packet flow that is present in the received ingress network packet flow 204. In some embodiments, data plane processor component $208_1$ may identify packet flows in the manner described above.

In step 3, in response to identifying a new and/or previously undetected packet flow, a data plane processor component 208 in the data plane processing pipeline 206 is configured to generate a copy of the first IV' packets (or at least a portion of the first N packets) of the newly observed packet flow (i.e., "Flow X"). In some embodiments, the value N may be a configurable value that is designated by the network administrator or may be a hardcoded value. For example, the value N may range from 1 to 3 (packets). The data plane processor component may then forward the aforementioned copy of the first N packets (e.g., see message 214) to one or more flow inspection engines 210 in network packet broker 202. In some embodiments, the data plane processor component that identified the new packet flow (e.g., component $208_1$) may be designated to send message 214 to flow inspection engine 210. In other embodiments, a data plane processor component (e.g., component $208_2$), which is separate and distinct from the data plane processor component that identified the new packet flow, is responsible for sending message 214 to flow inspection engine 210.

In step 4, flow inspection engine 210 may be configured to access and consult a flow inspection rules database 212 to identify and/or classify the new packet flow (i.e., Flow X). In particular, flow inspection engine 210 can utilize data from flow inspection rules database 212 to determine i) if flow records should be generated and ii) what type of flow records (e.g., IxFlow, NetFlow, etc.) should be generated for the packet flow. In some embodiments, flow inspection rules database 212 accessed by flow inspection engine 210 may include information that identifies and/or provides the network address (e.g., Internet protocol address) of a network tool(s) that should receive the generated packet flow record(s). In other embodiments, flow inspection rules database 212 may be configured to contain signature information. For example, the signature information may comprise application signatures that are used to identify traffic of a particular application type. Notably, the network packet broker can utilize the application signatures to separate traffic by application type so that the traffic of a particular application type can be sent to a network monitoring tool that is configured to analyze packet traffic of that application type (e.g., Facebook, Netflix, Twitter, Skype, and Twitter application types).

In step 5, after the first N packets to the flow have been sent (e.g., message 214) to the one or more flow inspection engines 210, the data plane processing pipeline 206 is configured in such a manner that no further copies of flow packet for 'Flow X' are generated or sent by data plane processor component(s) 208 to flow inspection engine 210. Additionally at this stage, at least one of the data plane processor components 208 (e.g., data plane processor components $208_2$) initiates the generation of metadata and/or statistics for the packets of Flow X. As used herein, examples of metadata and/or statistics information includes data such as, but not limited to, key(s) to identify the packet flow, the duration of the packet flow, a total number of packets in the flow, a total number of bytes in the packet flow, and the like. Further, the data plane processor component processes the plurality of packets in the packet flow to generate metadata or statistics (i.e., packet flow statistical data) independent of any instruction(s) from the flow inspection engine (see below). Namely, the data plane processor component does not receive any instructions or commands from the flow inspection engine with regard to the high-speed metadata or statistics generation processing conducted in the data plane processing pipeline itself.

In step 6, the metadata and/or statistics information (from step 5) generated by the data plane processor component is provided to flow inspection engine 210 via report message 216. In some embodiments, the generated metadata for Flow X is periodically reported to flow inspection engine 210 via one or more flow records (e.g., IxFlow, NetFlow, etc.) that are generated by data plane processing pipeline 206. For example, one or more data plane processor components is configured to generate flow statistics and/or metadata (e.g., key to identify the flow, total number of data packets processed, duration of the flow, total number of bytes, etc.) regarding the incoming data packets associated with the ingress flow (e.g., Flow X). The one or more data plane processor components may be configured to forward the collected flow statistics data and/or statistical metadata to flow inspection engine 210 on a periodic basis or a threshold basis (e.g., after a set number of packets are processed).

In step 7, the flow record(s) are forwarded to an associated tool or collector via an egress tool port. In some embodiments, flow inspection engine 210 is configured to direct the generated flow records (e.g., see flow record message 218) to one or more network tools or flow collectors via NPB egress port 222.

In step 8, the Flow X packets originally received at the ingress port or interface of network packet broker 202 are forwarded by data plane processing pipeline 206 (e.g., Flow X packets 220) to a network tool via an egress tool port 224. In many instances, Flow record data message 226 is directed to a network tool that differs from the network tool that is designated to receive egress tool flows 228. In some embodiments, the Flow X packets are simply forwarded to their intended destination (e.g., if the NPB is operating in an in-line mode) via egress port 224.

Figure 3:
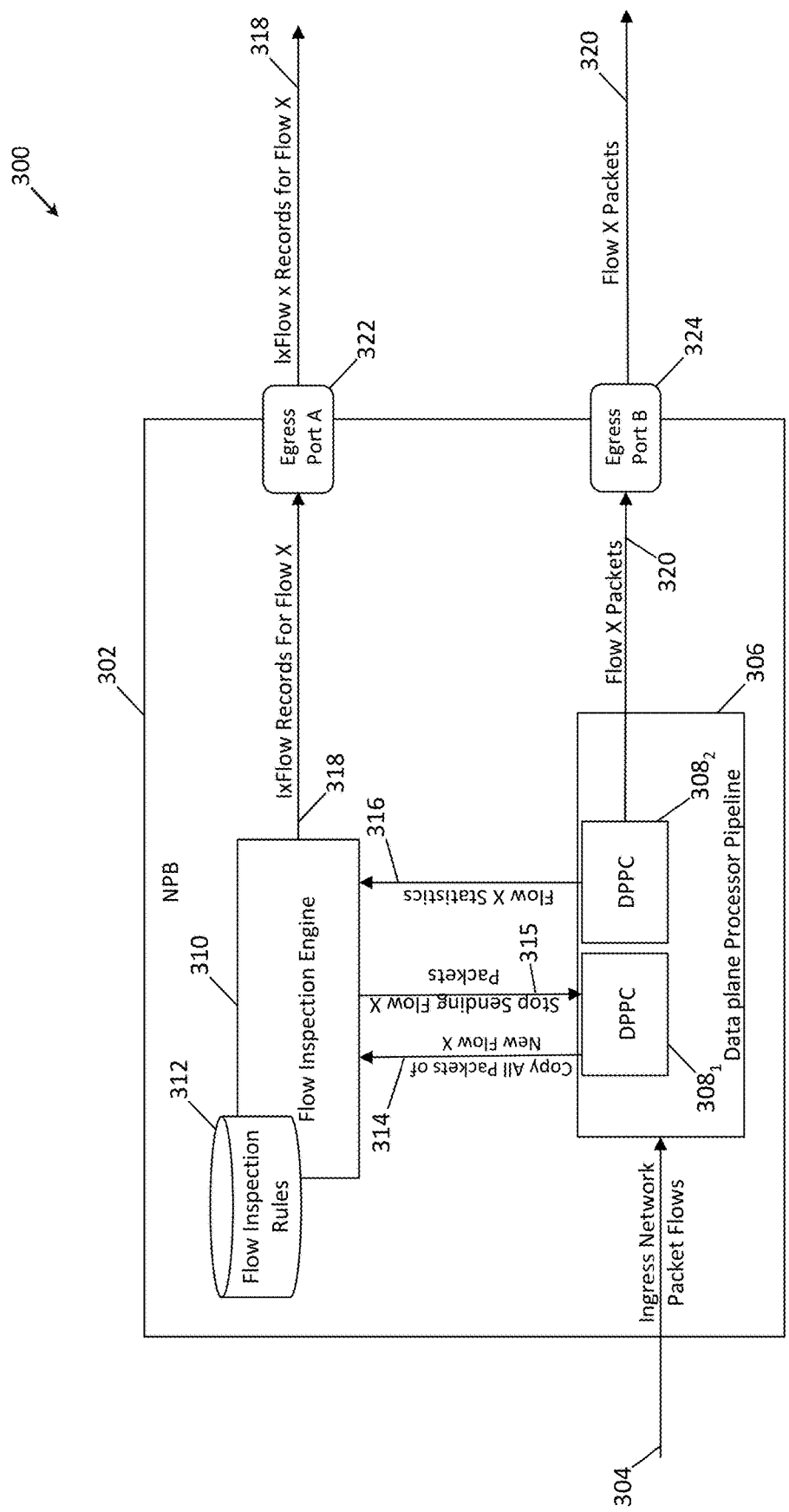
FIG. 3 is a block diagram illustrating an exemplary network packet broker that includes a flow inspection engine that is configured to operate with stop command messaging.

FIG. 3 is a block diagram illustrating another exemplary network packet broker 302 that includes a flow inspection engine. Like network packet broker 202 depicted in FIG. 2, network packet broker 302 in FIG. 3 can be configured to directly receive i) network packet traffic while operating in an in-line operation mode or ii) packet copies from network taps while operating in an out-of-band operation mode. Notably, network packet broker 302 includes a flow inspection engine 310 (e.g., a flow inspection engine element) and one or more hardware-based data plane processor components 308. Each of data plane processor components 308 may include, but not limited to, an ASIC processor, a P4-based programmable processor, a FPGA processor, or the like. Similar to the data plane processor components indicated above, data plane processor components 308 may be difficult to update and/or be configured to conduct network traffic analysis considering the different types of metadata processing that is being requested by network customers (e.g., application specific data, geographic data, handset data, and the like). It is also understood that while FIG. 3 illustrates flow inspection engines 310 and data plane processor components 308 located in a single network packet broker, the flow inspection engine does not necessarily need to reside in the same network element as the data plane processor components.

In some embodiments, data plane processor components 308 collectively form a data plane processing pipeline 306, which can be configured to receive and process a packet flow communicated from a source in a monitored network. In some embodiments, at least one of the data plane processor components 308 is configured to monitor the incoming ingress packets in an attempt to detect a new and/or previously undetected packet flow. Notably, one or more of the data plane processor components 308 is configured to parse an incoming packet and identify the source address and destination address information (e.g., Internet protocol addresses), thereby identifying and/or classifying a packet flow. This address information can be used by one or more of the data plane processor components 308 (e.g., compare to recently processed packet flow addresses) to determine if the presently received packet flow is new and/or previously undetected.

In one embodiment, the packet flow processing performed by network packet broker 302 that utilizes a stop command is conducted as follows:

In step 1, packets associated with one or more packet flows are received from a source entity located in a network that is being monitored by network packet broker 302. In some embodiments, an ingress network packet flow 304 received at an ingress network port of the network packet broker includes copies of live packet flows that have been obtained via one or more network taps (e.g., network packet broker 302 operating in out-of-band mode). In other embodiments, the packets of ingress network packet flow 304 may be live packets being communicated via the network (e.g., network packet broker 302 operating in an in-line mode).

In step 2, the received packets are processed in data plane processing pipeline 306 by one or more hardware data plane processor components 308. Notably, a data plane processor component $308_1$ may be configured to identify a new and/or previously undetected packet flow that is present in the received ingress network packet flow 304.

In step 3, in response to identifying a new and/or previously undetected packet flow, a data plane processor component 308 in data plane processing pipeline 306 is configured to generate a packet copy stream of the newly observed packet flow (i.e., "Flow X"). The data plane processor component may then forward the aforementioned copies of Flow X packets (e.g., see message 314) to flow inspection engine 310 in network packet broker 302. In some embodiments, the data plane processor component that identified the new packet flow (e.g., component $308_1$) may be designated to send message 314 to flow inspection engine 310. In other embodiments, a data plane processor component (e.g., component $308_2$), which is separate and distinct from the data plane processor component (e.g., component $308_1$) that identified the new packet flow, is responsible for sending message 314 to flow inspection engine 310.

In step 4, flow inspection engine 310 may be configured to access and consult a flow inspection rules database 312 to identify and/or classify the new packet flow (i.e., Flow X). In particular, flow inspection engine 310 can determine i) if flow records should be generated and ii) what type of flow records (e.g., IxFlow, NetFlow, etc.) should be generated for the packet flow. In some embodiments, flow inspection rules database 312 accessed by flow inspection engine 310 may include information that identifies and/or provides the network address (e.g., Internet protocol address) of a network tool(s) that should receive the generated packet flow record(s). In other embodiments, flow inspection rules database 312 may be configured to contain signature information.

In step 5, after flow inspection engine 310 has determined that sufficient information and/or number of packets have been received to begin generating a flow record, flow inspection engine 310 may send a "stop command" message 315 to data plane processing pipeline 306. In particular, stop command message 315 serves as a command message that instructs data plane processing pipeline 306 and/or its underlying data plane processor components 308 to cease the sending of Flow X packet copies. In response to receiving message 315, data plane processing pipeline 306 is configured to stop the sending any further copies of packets for 'Flow X' to flow inspection engine 310. In some embodiments, stop command message 315 may also serve as a trigger message that instructs data plane processing pipeline 306 and/or its underlying data plane processor components 308 to begin generating and sending metadata and/or statistics information to flow inspection engine 310.

In step 6, at least one of the data plane processor components 308 begin generating metadata and/or statistics for Flow X in response to receiving message 315. For example, at least one of the data plane processor components 308 (e.g., data plane processor component $308_2$) may be triggered to initiate the generation of metadata and/or statistics for the packets of Flow X in response to receiving message 315. In some embodiments, the metadata and/or statistics information generated by the data plane processor component is provided to flow inspection engine 310 via report message 318. In some embodiments, the generated metadata for Flow X is periodically reported to flow inspection engine 310 via one or more flow records (e.g., IxFlow, NetFlow, etc.) that are generated by the data plane processing pipeline 306. For example, one or more data plane processor components is configured to generate flow statistics (e.g., number of data packets processed, etc.) and/or statistical metadata regarding the incoming data packets associated with the ingress flow (e.g., Flow X). The one or more data plane processor components may be configured to forward the collected flow statistics data and/or statistical metadata to flow inspection engine 210 on a periodic basis or a threshold basis (e.g., after CM' packets are processed). Further, the data plane processor component processes the plurality of packets in the packet flow to generate metadata or statistics (i.e., packet flow statistical data) independent of any instruction(s) from the flow inspection engine (see below). Namely, the data plane processor component does not receive any instructions or commands from the flow inspection engine with regard to the high-speed metadata or statistics generation processing conducted in the data plane processing pipeline itself.

In step 7, the flow record(s) are forwarded to an associated tool or collector via an egress tool port. In some embodiments, flow inspection engine 210 is configured to direct the generated flow records (e.g., see flow record message 318) to one or more network tools or flow collectors via NPB egress port 322.

In step 8, the Flow X packets originally received at the ingress port or interface of network packet broker 302 are forwarded by data plane processing pipeline 306 (e.g., Flow X packets 320) to a network tool via an egress tool port 324. In many instances, Flow record data message 326 is directed to a network tool that differs from the network tool that is designated to receive egress tool flows 328. In some embodiments, the Flow X packets are simply forwarded to their intended destination (e.g., if the NPB is operating in an in-line mode) via egress port 324.

Figure 4:
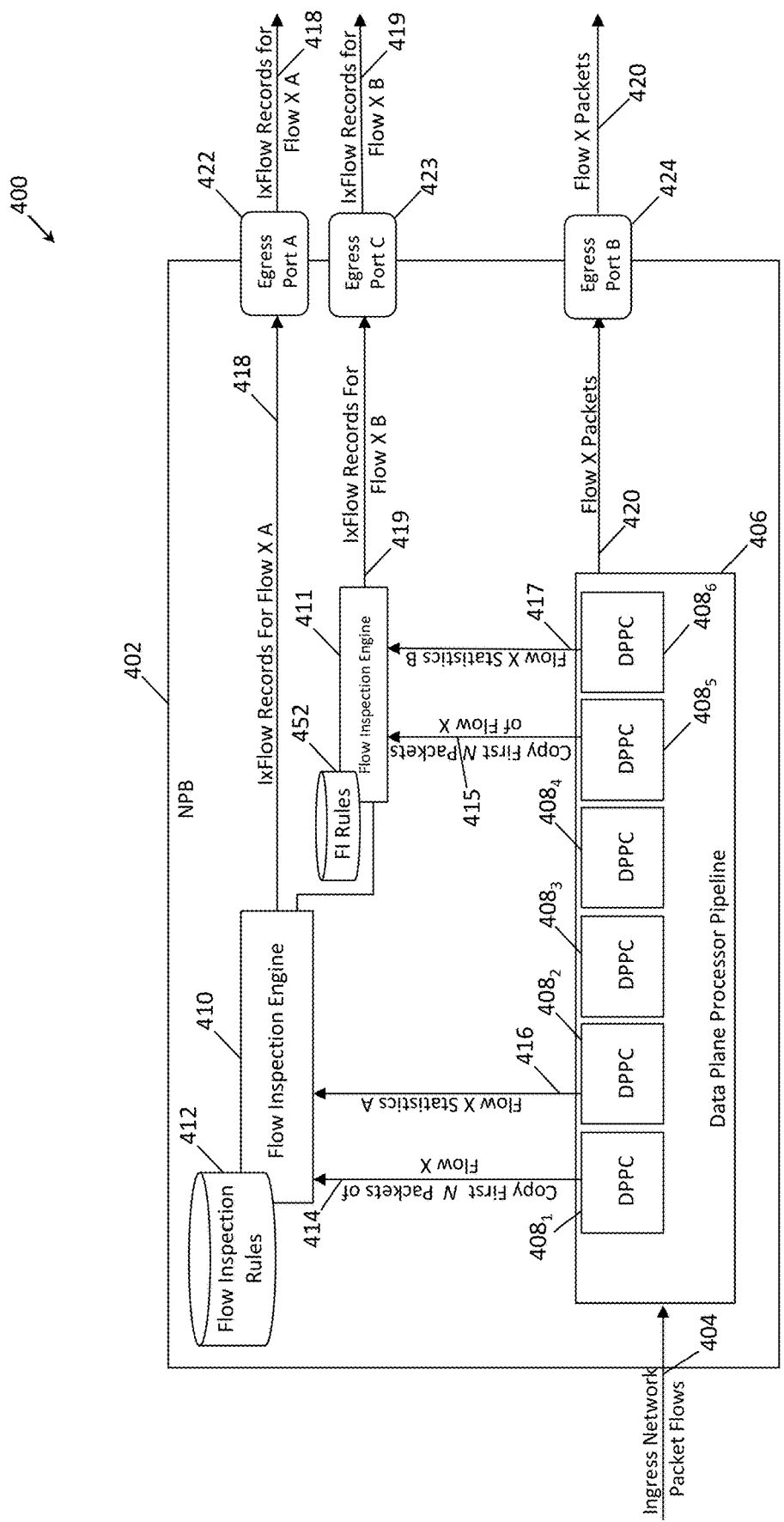
FIG. 4 is a block diagram illustrating an exemplary network packet broker that includes a plurality of flow inspection engines.

FIG. 4 is a block diagram illustrating an exemplary network packet broker 402 that includes a plurality of flow inspection engines. In some embodiments, network packet broker 402 can be configured to directly receive i) network packet traffic while operating in an in-line operation mode or ii) packet copies from network taps while operating in an out-of-band operation mode. As shown in FIG. 4, network packet broker 402 includes a pair of flow inspection engines 410-411 (e.g., flow inspection engine elements) and a plurality of hardware-based data plane processor components $408_{1-6}$. Although only two flow inspection engines are depicted in FIG. 4, any number of flow inspection engines can be utilized in network packet broker 402 without departing from the scope of the disclosed subject matter. It is also understood that while FIG. 4 illustrates flow inspection engines 410-411 and data plane processor components $408_{1-6}$ located in a single network packet broker, the flow inspection engines do not necessarily need to reside in the same network element as the data plane processor components. Moreover, each of data plane processor components 408 may include, but not limited to, an application specific integrated circuit (ASIC) processor, a P4-based programmable processor, a field programmable gate array (FPGA) processor, or the like.

In some embodiments, data plane processor components 408 collectively form a data plane processing pipeline 406, which can be configured to receive and process a packet flow communicated from a source in a monitored network. In particular, a plurality of data plane processor components 408 can be configured to monitor the incoming ingress packets in an attempt to detect a new and/or previously undetected packet flow. For example, two or more of the data plane processor components 408 (e.g., data plane processor components $408_1$ and $408_3$) are each configured to parse incoming packets and identify the source address and destination address information (e.g., Internet protocol addresses). The address and destination address information parsed by the data plane processor components 408 can be used (e.g., compare to packet flow addresses processed recently) to determine if the presently received packet flow is new and/or previously undetected. The embodiment illustrated in FIG. 4 entails two sets of data plane processing components that are respectively operating with a flow inspection engine in a concurrent manner. For example, data plane processor components $408_1$ and $408_2$ are communicating with flow inspection engine 410, while data plane processor components $408_5$ and $408_6$ are communicating with flow inspection engine 411.

In one embodiment, the packet flow processing performed by network packet broker 402 is conducted as follows:

In step 1, packets associated with one or more packet flows are received from a source entity located in a network that is being monitored by network packet broker 402. In some embodiments, an ingress network packet flow 404 received at the ingress network port of the network packet broker includes copies of live packet flows that have been obtained via one or more network taps (e.g., network packet broker 402 operating in out-of-band mode). In other embodiments, the packets of ingress network packet flow 404 may be live packets being communicated via the network (e.g., network packet broker 402 operating in an in-line mode).

In step 2, the received packets are processed in data plane processing pipeline 406 by a plurality of data plane processor components 408. As previously mentioned, each of data plane processor component $408_1$ and $408_5$ may be configured to separately/individually identify a new and/or previously undetected packet flow that is present in the received ingress network packet flow 404.

In step 3, in response to separately identifying a new and/or previously undetected packet flow, each of data plane processor components $408_1$ and $408_5$ is configured to generate a copy of the first IV' packets of the newly observed packet flow (i.e., "Flow X"). In some embodiments, the value N may be a configurable value that is designated by the network administrator or may be a hardcoded value. For example, the value N may range from 1 to 3 (packets). Each of data plane processor components $408_1$ and $408_5$ may then forward the aforementioned copy of the first N packets (e.g., see message 414 and message 415) to flow inspection engines 410 and 411, respectively. In some embodiments, the data plane processor component that identified the new packet flow (e.g., component $408_1$) may be designated to send message 414 to flow inspection engine 410 (or component $408_5$ sends message 415 to flow inspection engine 411). In other embodiments, a data plane processor component (e.g., component $408_2$ or component $408_6$), which is separate and distinct from the data plane processor component that identified the new packet flow, is responsible for sending message 414 to flow inspection engine 410 (or message 415 to flow inspection engine 411).

In step 4, flow inspection engine 410 may be configured to access and consult a flow inspection rules database 412 to identify and/or classify the new packet flow (i.e., Flow X). Concurrently, flow inspection engine 411 may be configured to access and consult a flow inspection rules database 452 to identify and/or classify the new packet flow. For example, each of flow inspection engines 410 and 411 can separately determine i) if flow records should be generated and ii) what type of flow records (e.g., IxFlow, NetFlow, etc.) should be generated for the packet flow. In some embodiments, each of flow inspection rules database 412 and flow inspection rules database 452 may include information that identifies and/or provides the network address (e.g., Internet protocol addresses) of the network tools that should receive the generated packet flow record(s). In other embodiments, flow inspection rules databases 412 and 452 may be configured to contain signature information.

In step 5, after the first N packets to the flow have been sent (e.g., message 414) to flow inspection engine 410, the data plane processing pipeline 406 is configured in such a manner that no further copies of packets for 'Flow X' are generated or sent by data plane processor component $408_1$ to flow inspection engine 410. Likewise, after the first N packets to the flow have been sent (e.g., message 415) to flow inspection engine 411, the data plane processing pipeline 406 is configured in such a manner that no further copies of packets for 'Flow X' are generated or sent by data plane processor component $408_5$ to flow inspection engine 411. Additionally at this stage, each of data plane processor components $408_2$ and $408_6$ initiates the generation of metadata and/or statistics for the packets of Flow X.

In step 6, the metadata and/or statistics information (from step 5) generated by each of data plane processor components $408_2$ and $408_6$ is provided to flow inspection engines 410 and 411 via report messages 416 and 417, respectively. In some embodiments, the generated metadata for Flow X is periodically reported to flow inspection engines 410 and 411 via one or more flow records (e.g., IxFlow, NetFlow, etc.) that are generated by data plane processing pipeline 406. For example, each of data plane processor components $408_2$ and $408_6$ is configured to generate flow statistics (e.g., number of data packets processed, etc.) and/or statistical metadata regarding the incoming data packets associated with the ingress flow (e.g., Flow X). Data plane processor components $408_2$ and $408_6$ may be configured to forward the collected flow statistics data and/or statistical metadata to flow inspection engines 410 and 411 on a periodic basis or a threshold basis (e.g., after a set number of packets are processed). For example in FIG. 4, message 416 containing "statistics A" is sent by data plane processor component $408_2$ to flow inspection engine 410 and message 417 containing "statistics B" is sent by data plane processor component $408_5$ to flow inspection engine 411. It should be noted the flow statistics and/or metadata (e.g., statistics A) provided by data plane processor component $408_2$ to flow inspection engine 410 may be the same or different than the flow statistics and metadata (e.g., statistics B) provided by data plane processor component $408_5$ to flow inspection engine 411. In some embodiments, if multiple data plane processors are used for load balancing functionality, each of the data plane processors is configured to send the same type of statistics, but for different packet flows. Alternatively, different data plane processors could also be utilized to process different types of flows. In such a scenario, the data plane process would send different types of statistics. Further, the data plane processor component processes the plurality of packets in the packet flow to generate metadata or statistics (i.e., packet flow statistical data) independent of any instruction(s) from the flow inspection engine (see below). Namely, the data plane processor component does not receive any instructions or commands from the flow inspection engine with regard to the high-speed metadata or statistics generation processing conducted in the data plane processing pipeline itself.

In step 7, the flow record(s) are forwarded to an associated tool or collector via an egress tool port. In some embodiments, flow inspection engine 410 is configured to direct the generated flow records to one or more network tools or flow collectors via NPB egress ports 422 and 423. In particular, flow inspection engine 410 can use flow record message 418 to send flow records (e.g., IxFlow or NetFlow records) of a particular type (e.g. Flow X A records) to a monitoring tool via egress port 422. Similarly, flow inspection engine 411 can use flow record message 419 to direct the generated flow records (e.g. Flow X B records) to one or more network tools or flow collectors via NPB egress port 423.

In step 8, the Flow X packets originally received at the ingress port or interface of network packet broker 402 are forwarded by data plane processing pipeline 406 (e.g., Flow X packets 420) to a network tool via an egress tool port 424. In many instances, Flow X packets 420 may be directed to a network tool that differs from the network tool that is designated to receive egress tool flow record messages 418 or 419. In some embodiments, the Flow X packets are simply forwarded to their intended destination (e.g., if the NPB is operating in an in-line mode) via egress port 424.

Figure 5:
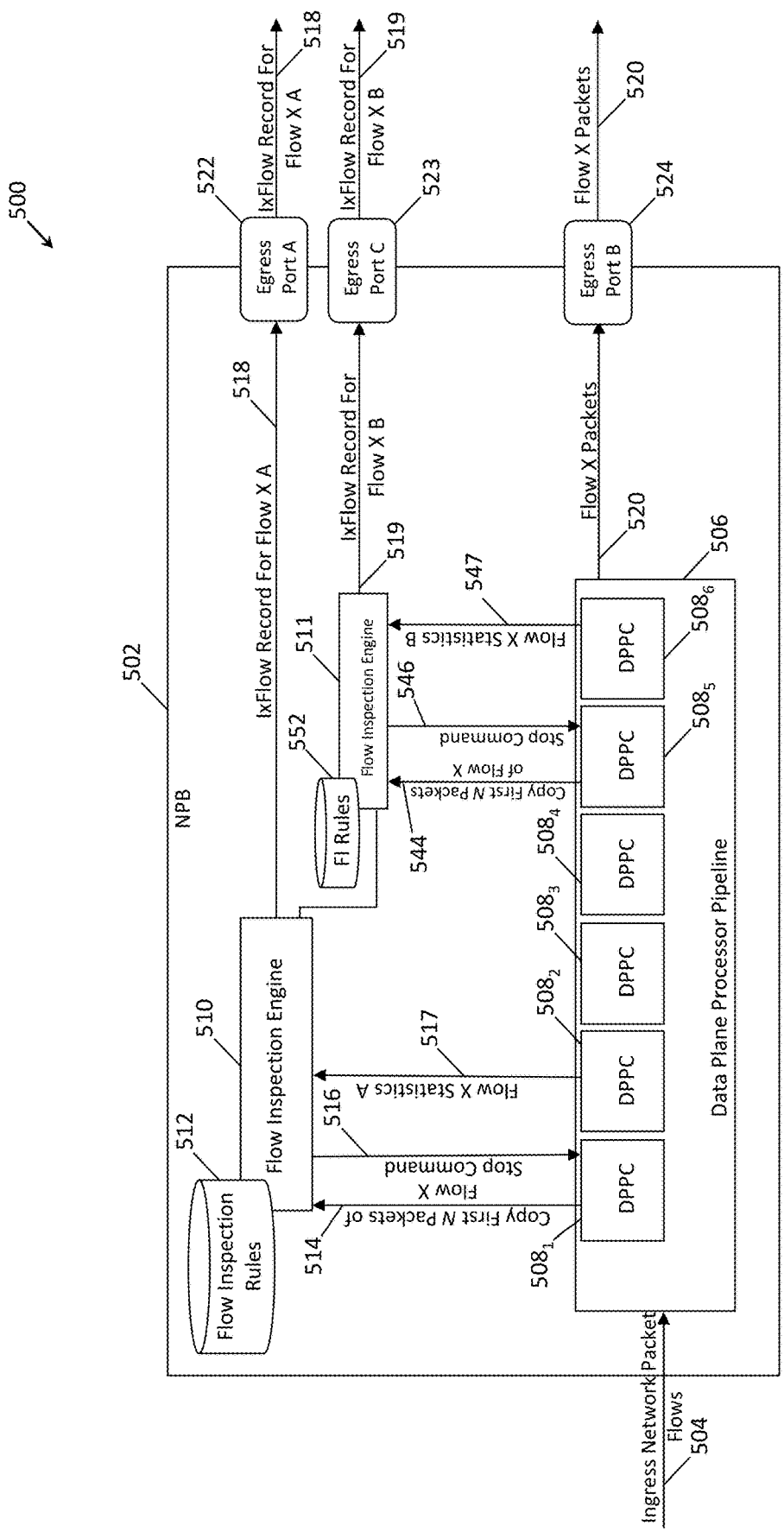
FIG. 5 is a block diagram illustrating an exemplary network packet broker that includes a plurality of flow inspection engine that is configured to operate with stop command messaging.

FIG. 5 is a block diagram illustrating an exemplary network packet broker 502 that includes a plurality of flow inspection engines. Similar to the embodiments described above, network packet broker 502 can be configured to directly receive i) network packet traffic while operating in an in-line operation mode or ii) packet copies from network taps while operating in an out-of-band operation mode. As shown in FIG. 5, network packet broker 502 includes a pair of flow inspection engines 510-511 (e.g., flow inspection engine elements) and a plurality of hardware-based data plane processor components $508_{1-6}$. Although only two flow inspection engines are depicted in FIG. 5, any number of flow inspection engines can be utilized in network packet broker 502 without departing from the scope of the disclosed subject matter. It is also understood that while FIG. 5 illustrates flow inspection engines 510-511 and data plane processor components $508_{1-6}$ located in a single network packet broker, the flow inspection engines do not necessarily need to reside in the same network element as the data plane processor components. Moreover, each of data plane processor components 508 may include, but not limited to, an application specific integrated circuit (ASIC) processor, a P4-based programmable processor, a field programmable gate array (FPGA) processor, or the like.

In some embodiments, data plane processor components 508 collectively form a data plane processing pipeline 506, which can be configured to receive and process a packet flow communicated from a source in a monitored network. In particular, a plurality of data plane processor components 508 can be configured to monitor the incoming ingress packets in an attempt to detect a new and/or previously undetected packet flow. For example, two or more of the data plane processor components 508 (e.g., data plane processor components $508_1$ and $508_3$) are each configured to parse incoming packets and identify the source address and destination address information (e.g., Internet protocol addresses). The address and destination address information parsed by the data plane processor components 508 can be used (e.g., compare to packet flow addresses processed recently) to determine if the presently received packet flow is new and/or previously undetected. The embodiment illustrated in FIG. 5 entails two sets of data plane processing components that are respectively operating with a dedicated flow inspection engine in a concurrent manner. For example, data plane processor components $508_1$ and $508_2$ are communicating with flow inspection engine 510, while data plane processor components $508_5$ and $508_6$ are communicating with flow inspection engine 511.

In one exemplary embodiment, the packet flow processing performed by network packet broker 502 is conducted as follows:

In step 1, packets associated with one or more packet flows are received from a source entity located in a network that is being monitored by network packet broker 502. In some embodiments, an ingress network packet flow 504 received at the ingress network port of the network packet broker includes copies of live packet flows that have been obtained via one or more network taps (e.g., network packet broker 502 operating in out-of-band mode). In other embodiments, the packets of ingress network packet flow 504 may be live packets being communicated via the network (e.g., network packet broker 502 operating in an in-line mode).

In step 2, the received packets are processed in data plane processing pipeline 506 by a plurality of data plane processor components 508. As previously mentioned, each of data plane processor component $508_1$ and $508_5$ may be configured to separately/individually identify a new and/or previously undetected packet flow that is present in the received ingress network packet flow 504. In step 3, in response to separately identifying a new and/or previously undetected packet flow, each of data plane processor components $508_1$ and $508_5$ is configured to Generate a packet copy stream of the newly observed packet flow (i.e., Flow X). The data plane processor components may then forward the aforementioned copies of Flow X packets to the flow inspection engines via messages 514 and 544. In particular, data plane processor component $508_1$ can send message 514 to flow inspection engine 510 while data plane processor component $508_5$ can send message 544 to flow inspection engine 511. In some embodiments, the data plane processor component that identified the new packet flow (e.g., component $508_1$) may be configured to send message 514 to flow inspection engine 510 (or component or $508_5$ sending message 515 to flow inspection engine 511). In other embodiments, a data plane processor component (e.g., component $508_2$ or component $508_6$), which is separate and distinct from the data plane processor component that identified the new packet flow, is responsible for sending message 514 to flow inspection engine 510 (or message 515 to flow inspection engine 511).

In step 4, flow inspection engine 510 may be configured to access and consult a flow inspection rules database 512 to identify and/or classify the new packet flow (i.e., Flow X). Concurrently, flow inspection engine 511 may be configured to access and consult a flow inspection rules database 552 to identify and/or classify the new packet flow. For example, each of flow inspection engines 510 and 511 can separately determine i) if flow records should be generated and ii) what type of flow records (e.g., IxFlow, NetFlow, etc.) should be generated for the packet flow. In some embodiments, each of flow inspection rules database 512 and flow inspection rules database 552 may include information that identifies and/or provides the network address (e.g., Internet protocol addresses) of the network tools that should receive the generated packet flow record(s). In other embodiments, flow inspection rules databases 512 and 552 may be configured to contain signature information.

In step 5, after each of flow inspection engine 510 and flow inspection engine 511 has individually determined that sufficient information and/or number of packets have been respectively received to begin generating a flow record, flow inspection engine 510 and/or flow inspection engine 511 can send a "stop command" message to data plane processing pipeline 506. For example, flow inspection engine 510 can send stop command message 516 to data plane processor component $508_1$ and flow inspection engine 511 can send stop command message 546 to data plane processor component $508_5$.

It will be appreciated that flow inspection engines 510 and 511 may require the receipt of differing numbers of flow X packets from the data plane processing pipeline (e.g., 10 packets for flow inspection engine vs. 20 packets for flow inspection engine) to initiate the stop command message that is sent to the data plane processor components. In particular, each of these stop command messages serves as a signaling message that instructs data plane processing pipeline 506 and/or its underlying data plane processor components 508 to cease the sending of Flow X packet copies. In response to receiving a stop command message, data plane processing pipeline 506 is configured to stop the sending any further copies of packets for 'Flow X' to the sending flow inspection engine. In some embodiments, the stop command message may also serve as a trigger message that instructs data plane processing pipeline 506 and/or its underlying data plane processor components 508 to begin generating or collecting metadata and/or statistics as well as sending metadata and/or statistics information to the sending flow inspection engine.

In step 6, the metadata and/or statistics information (from step 5) generated by each of data plane processor components $508_2$ and $508_6$ is provided to flow inspection engines 510 and 511 via report messages 517 and 547, respectively. In some embodiments, the generated metadata for Flow X is periodically reported to flow inspection engines 510 and 511 via one or more flow records (e.g., IxFlow, NetFlow, etc.) that are generated by data plane processing pipeline 506. For example, each of data plane processor components $508_2$ and $508_6$ is configured to generate flow statistics (e.g., number of data packets processed, etc.) and/or statistical metadata regarding the incoming data packets associated with the ingress flow (e.g., Flow X). Data plane processor components $508_2$ and $508_6$ may be configured to forward the collected flow statistics data and/or statistical metadata to flow inspection engines 510 and 511 on a periodic basis or a threshold basis (e.g., after a set number of packets are processed). For example in FIG. 5, message 517 containing "statistics set A" is sent by data plane processor component $508_2$ to flow inspection engine 510 and message 547 containing "statistics set B" is sent by data plane processor component $508_5$ to flow inspection engine 511. It should be noted the flow statistics and/or metadata (e.g., statistic set A) provided by data plane processor component $508_2$ to flow inspection engine 510 may be the same or different than the flow statistics and metadata (e.g., statistics set B) provided by data plane processor component $508_5$ to flow inspection engine 511. Further, the data plane processor component processes the plurality of packets in the packet flow to generate metadata or statistics (i.e., packet flow statistical data) independent of any instruction(s) from the flow inspection engine (see below). Namely, the data plane processor component does not receive any instructions or commands from the flow inspection engine with regard to the high-speed metadata or statistics generation processing conducted in the data plane processing pipeline itself In step 7, the flow record(s) are forwarded to an associated tool or collector via an egress tool port. In some embodiments, flow inspection engine 510 is configured to direct the generated flow records to one or more network tools or flow collectors via NPB egress ports 522 and 523. In particular, flow inspection engine 510 can use flow record message 518 to send flow records (e.g., IxFlow or NetFlow records) of a particular type (e.g. Flow X set A records) to a downstream monitoring tool via egress port 522. Similarly, flow inspection engine 511 can use flow record message 519 to direct the generated flow records (e.g. Flow X set B records) to one or more downstream network tools or flow collectors via NPB egress port 523. It is appreciated that the flow records generated by flow inspection engines 510 and 511 may include the same or different flow metadata and may be communicated to the same or different downstream network nodes (i.e., monitoring tool or flow collector).

In step 8, the Flow X packets originally received at the ingress port or interface of network packet broker 502 are forwarded by data plane processing pipeline 506 (e.g., Flow X packets 520) to a network tool via an egress tool port 524. In many instances, Flow X packets 520 may be directed to a network tool that differs from the network tool(s) designated to receive egress tool flows 518 and/or 519. In some embodiments, the Flow X packets are simply forwarded to their intended destination (e.g., if the NPB is operating in an in-line mode) via egress port 524.

Figure 6:
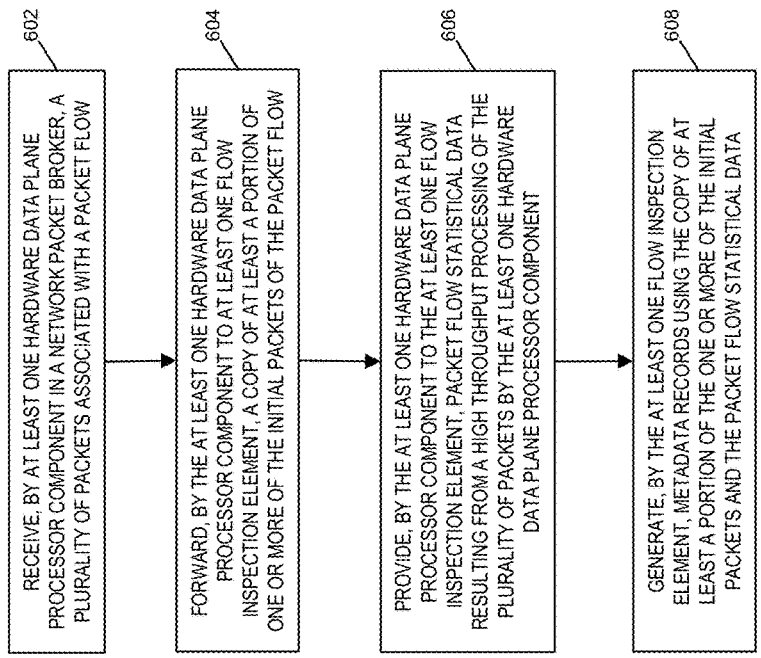
FIG. 6 is a flow chart illustrating an exemplary process for selectively processing a packet flow using a flow inspection engine.

FIG. 6 is a flow chart illustrating an example process for selectively processing a packet flow using a flow inspection engine according to an embodiment of the subject matter described herein. In some embodiments, method 600 depicted in FIG. 6 is an algorithm, program, or script stored in memory that when executed by a processor performs the steps recited in blocks 602-606. In some embodiments, the method 600 represents a list of steps (or changes in steps) embodied in a software based construct (e.g., a virtual machine or software code programming executed by an on-board system on a chip) and/or in logic of a hardware device.

In block 602, method 600 includes receiving, by at least one hardware data plane processor component in a network packet broker, a plurality of packets associated with a packet flow. In some embodiments, a data plane processing pipeline in a NPB receives a stream of packets. For example, the packet stream can be copies of packets received from one or more network taps. During this time, at least one hardware data plane processor component of the data plane processing pipeline is configured to identify a new or unseen packet flow. Further, the data plane processor component processes the plurality of packets in the packet flow to generate metadata or statistics (i.e., packet flow statistical data) independent of any instruction(s) from the flow inspection engine (see below). Namely, the data plane processor component does not receive any instructions or commands from the flow inspection engine with regard to the high-speed metadata or statistics generation processing conducted in the data plane processing pipeline itself.

In block 604, method 600 includes forwarding, by the at least one hardware data plane processor component to at least one flow inspection engine, a copy of one or more initial packets of the packet flow. After the at least one hardware data plane processor component of the data plane processing pipeline identifies a new or unseen packet flow, the component is configured to forward a copy of one or more of the initial packets of the packet flow to a flow inspection engine. In some embodiments, the hardware data plane processor component is configured to forward a predefined number (N) of the initial packets to a flow inspection engine in the NPB. For example, the first three packets of the packet flow may be sent to the flow inspection engine for processing.

In block 606, method 600 includes providing, by the at least one hardware data plane processor component to the at least one flow inspection engine, packet flow statistical data resulting from a high throughput processing of the plurality of packets by the at least one hardware data plane processor component. In some embodiments, a hardware data plane processor component continues to conduct high throughput processing on the received packets of the packet flow. Notably, the hardware data plane processor component obtains statistics or other metric data from the processing and forwards a report message containing packet flow statistical data to the flow inspection engine.

In block 608, method 600 includes generating, by the at least one flow inspection engine, metadata records using the copy of the one or more of the initial packets and the packet flow statistical data. In some embodiments, the flow inspection engine correlates the packet flow statistical data and the initial packets via the use of a flow identifier or flow tag. Notably, each of the packet flow statistical data and the initial packets includes a flow identifier that was assigned by the hardware data plane processor component. Using the statistical data and the initial packet data, the flow inspection engine is able to generate metadata records, such as IxFlow records or NetFlow records, which are subsequently provided to a monitoring tool as described above.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for selectively processing a packet flow using a flow inspection engine, the method comprising:
receiving, by a first hardware data plane processor component of a plurality of hardware data plane processor components in a network packet broker, a plurality of packets associated with a packet flow, wherein the network packet broker comprises a network device that forwards copies of packets communicated over a monitored network to one or more network tools when operating in an out-of-band mode of operation, each of the plurality of hardware data plane processor components comprising a P4-based programmable processor and the plurality of hardware data plane processor components collectively forming a packet processing pipeline of the network packet broker;
forwarding, by the first hardware data plane processor component to at least one flow inspection engine in the network packet broker, a copy of at least a portion of each of a first N initial packets of the packet flow, N being an integer of at least one and less than an entirety of packets of the packet flow, the at least one flow inspection engine being implemented in software;
after forwarding the copies of the at least a portion of each of the first N initial packets of the packet flow to the at least one flow inspection engine, ceasing, by the first hardware data plane processor component, of the forwarding of copies of the at least of a portion of each of the packets of the packet flow to the at least one flow inspection engine independent of any instruction from the at least one flow inspection engine;
providing, by a second hardware data plane processor component of the plurality of hardware data plane processor components and separate from the first hardware data plane processor components, to the at least one flow inspection engine, packet flow statistical data resulting from high throughput processing of the plurality of packets by the second hardware data plane processor component;
generating, by the at least one flow inspection engine, metadata records using the copies of the at least a portion of each of the first N initial packets and the packet flow statistical data;

accessing, by the at least one flow inspection engine, a flow inspection rules database and identifying at least one of the one or more network tools to receive the metadata records; and forwarding, by the at least one flow inspection engine, the metadata records to the at least one of the one or more network tools, wherein the second hardware data plane processor component generates the statistical data from the plurality of packets independent of any instruction from the at least one flow inspection engine.

2. The method of claim 1 wherein the first hardware data plane processor component ceases the forwarding of copies of the at least a portion of each of the packets of the packet flow to the at least one flow inspection automatically after the copies of at least a portion of each of the first N initial packets of the packet flow are forwarded to the at least one flow inspection engine.

3. The method of claim 1 wherein the packet flow statistical data and the copies of at least a portion of each of the first N initial packets are identified by a common flow identifier.

4. A system for selectively processing a packet flow using a flow inspection engine, the system comprising:
  a network packet broker comprising a network device that forwards copies of packets communicated over a monitored network to one or more network tools when operating in an out-of-band mode of operation;
  a data plane processing pipeline located in the network packet broker and comprising a plurality of hardware data plane processor components, each of the plurality of hardware data plane processor components comprising a P4-based programmable processor and the plurality of hardware data plane processor components collectively forming a packet processing pipeline of the network packet broker, wherein a first data plane processor component of the plurality of hardware data plane processor components is configured to receive a plurality of packets associated with a packet flow, forward a copy of at least a portion of each of a first N initial packets of the packet flow, N being an integer of at least one and less than an entirety of packets of the packet flow, after forwarding the first N initial packets of the packet flow to the at least one flow inspection engine, ceasing, by the first hardware data plane processor component, of the forwarding of copies of at least a portion of each of the packets of the packet flow to the at least one flow inspection engine independent of any instruction from the at least one flow inspection engine, and a second hardware data plane processor component of the plurality of hardware data plane processor components and separate from the first hardware data plane processor components is configured to generate packet flow statistical data resulting from a high throughput processing of the plurality of packets by the second hardware data plane processor components; and
  at least one flow inspection engine implemented in software in the network packet broker and configured to generate metadata records using the copy of at least a portion of the at least a portion of each of the N initial packets received from the first data plane processor component and the packet flow statistical data received from the second hardware data plane processor component, access a flow inspection rules database, identify at least one of the one or more network tools to receive the metadata records, and forward the metadata records to the at least one of the one or more network tools;
  wherein the first hardware data plane processor component generates the packet flow statistical data from the plurality of packets independent of any instruction from the at least one flow inspection engine.

5. The system of claim 4 wherein the first hardware data plane processor component is configured to cease the forwarding of copies the at least a portion of each of the packets of the packet flow to the at least one flow inspection automatically after the copies of the at least a portion of each of first N initial packets of the packet flow are forwarded to the at least one flow inspection engine.

6. The system of claim 4 wherein the packet flow statistical data and the copies of at least a portion of each of the first N initial packets are identified by a common flow identifier.

7. A non-transitory computer readable medium having stored thereon executable instructions that when executed by at least one processor of a computer cause the computer to perform steps comprising:
  receiving, by a first hardware data plane processor component of a plurality of hardware data plane processor component of a plurality of hardware data plane processor components in a network packet broker, a plurality of packets associated with a packet flow, wherein the network packet broker comprises a network device that forwards copies of packets communicated over a monitored network to one or more network tools when operating in an out-of-band mode of operation, each of the plurality of hardware data plane processor components comprising a P4-based programmable processor and the plurality of hardware data plane processor components collectively forming a packet processing pipeline of the network packet broker;
  forwarding, by the first hardware data plane processor component to at least one flow inspection engine located in the network packet broker, a copy of at least a portion of each of a first N initial packets of the packet flow, N being an integer of at least one and less than an entirety of packets of the packet flow, the at least one flow inspection engine being implemented in software;
  after forwarding the copies of the at least a portion of each of first N initial packets of the packet flow to the at least one flow inspection engine, ceasing, by the first hardware data plane processor component, of the forwarding of copies at least of a portion of each of the packets of the packet flow to the at least one flow inspection engine independent of any instruction from the at least one flow inspection engine;
  providing, by a second hardware data plane processor component of the plurality of hardware data plane processor components and separate from the first hardware data plane processor components, to the at least one flow inspection engine, packet flow statistical data resulting from a high throughput processing of the plurality of packets by the second hardware data plane processor component;
  generating, by the at least one flow inspection engine, metadata records using the copies of the at least a portion of each of the first N initial packets and the packet flow statistical data; and
  accessing, by the at least one flow inspection engine, a flow inspection rules database and identifying at least one of the one or more network tools to receive the metadata records;

forwarding, by the at least one flow inspection engine, the metadata records to the at least one of the one or more network tools, wherein the at least one hardware data plane processor component generates the packet flow statistical data from the plurality of packets independent of any instruction from the at least one flow inspection engine, wherein the at least one hardware data plane processor component comprises a P4-based programmable processor.

8. The non-transitory computer readable medium of claim 7 wherein the first hardware data plane processor component is configured to cease the forwarding of copies of the at least a portion of each of packets of the packet flow to the at least one flow inspection automatically after the copies of at least a portion of each of first N initial packets of the packet flow are forwarded to the at least one flow inspection engine.

* * * * *